United States Patent [19]

Ellithorpe et al.

[11] 3,912,431
[45] Oct. 14, 1975

[54] APPARATUS FOR THE SOLIDIFICATION OF MOLTEN SULPHUR

[75] Inventors: Ernest Ralph Ellithorpe; Ronald Bruce Fletcher, both of Calgary, Canada

[73] Assignee: Vennard & Ellithorpe, Calgary, Canada

[22] Filed: Dec. 23, 1974

[21] Appl. No.: 535,651

Related U.S. Application Data

[62] Division of Ser. No. 448,152, March 4, 1974, which is a division of Ser. No. 207,909, Dec. 14, 1971, Pat. No. 3,832,145.

[30] Foreign Application Priority Data

Dec. 24, 1970 Canada .................................. 101481

[52] U.S. Cl. ................. 425/6; 23/293 S; 23/273 R; 62/345; 62/71; 198/201; 425/223
[51] Int. Cl.²... F28F 5/00; B01D 9/00; C01B 17/02
[58] Field of Search ........... 23/308 S, 293 S, 273 R, 23/270 B, 273 F; 165/1, 120; 198/201, 198; 62/345, 359; 425/6, 223

[56] References Cited
UNITED STATES PATENTS

| | | | |
|---|---|---|---|
| 1,004,858 | 10/1911 | Dow | 23/273 R |
| 1,366,474 | 1/1921 | Merz | 23/273 R |
| 1,528,043 | 3/1925 | Bennett | 62/345 |
| 1,742,194 | 1/1930 | Bennett | 62/345 |
| 1,773,079 | 8/1930 | Birdseye | 62/345 |
| 2,035,990 | 3/1936 | Siegler | 23/273 R |
| 2,902,719 | 9/1959 | Hindes | 23/273 R |
| 3,619,146 | 11/1971 | Terry | 23/308 S |

FOREIGN PATENTS OR APPLICATIONS

| | | | |
|---|---|---|---|
| 1,221,874 | 1/1960 | France | 23/293 S |
| 132,648 | 2/1960 | U.S.S.R. | 62/345 |
| 916,319 | 6/1946 | France | 62/345 |
| 214,344 | 3/1924 | United Kingdom | 425/6 |

*Primary Examiner*—Norman Yudkoff
*Assistant Examiner*—S. J. Emery
*Attorney, Agent, or Firm*—Joel E. Siegel; Charles M. Kaplan

[57] ABSTRACT

A method of solidifying molten sulphur involves forming on a belt at least one undulation which is shaped to permit the formation of a pool of molten sulphur. Molten sulphur is fed onto the belt so that a pool is formed on the undulation. The speed of the belt is controlled in relation to the feed rate of the sulphur and in relation to the angle and length of the surface of the undulation remote from a feeding section for the sulphur so that molten sulpur is caused to form into a layer and solidify on the belt as it passes through the pool. Cooled or partially cooled sulphur is then delivered from the surface of the belt. The angle of undulation extending upwardly and away from the feeding section is normally within the range of one half a degree to about three degrees. Apparatus for use in the solidification of molten sulphur is also provided. A cooling tank assembly provided with a plurality of generally transversely disposed baffles includes means for directing a supply of air into the assembly with an air deflector embodied in the cooling tank structure.

8 Claims, 5 Drawing Figures

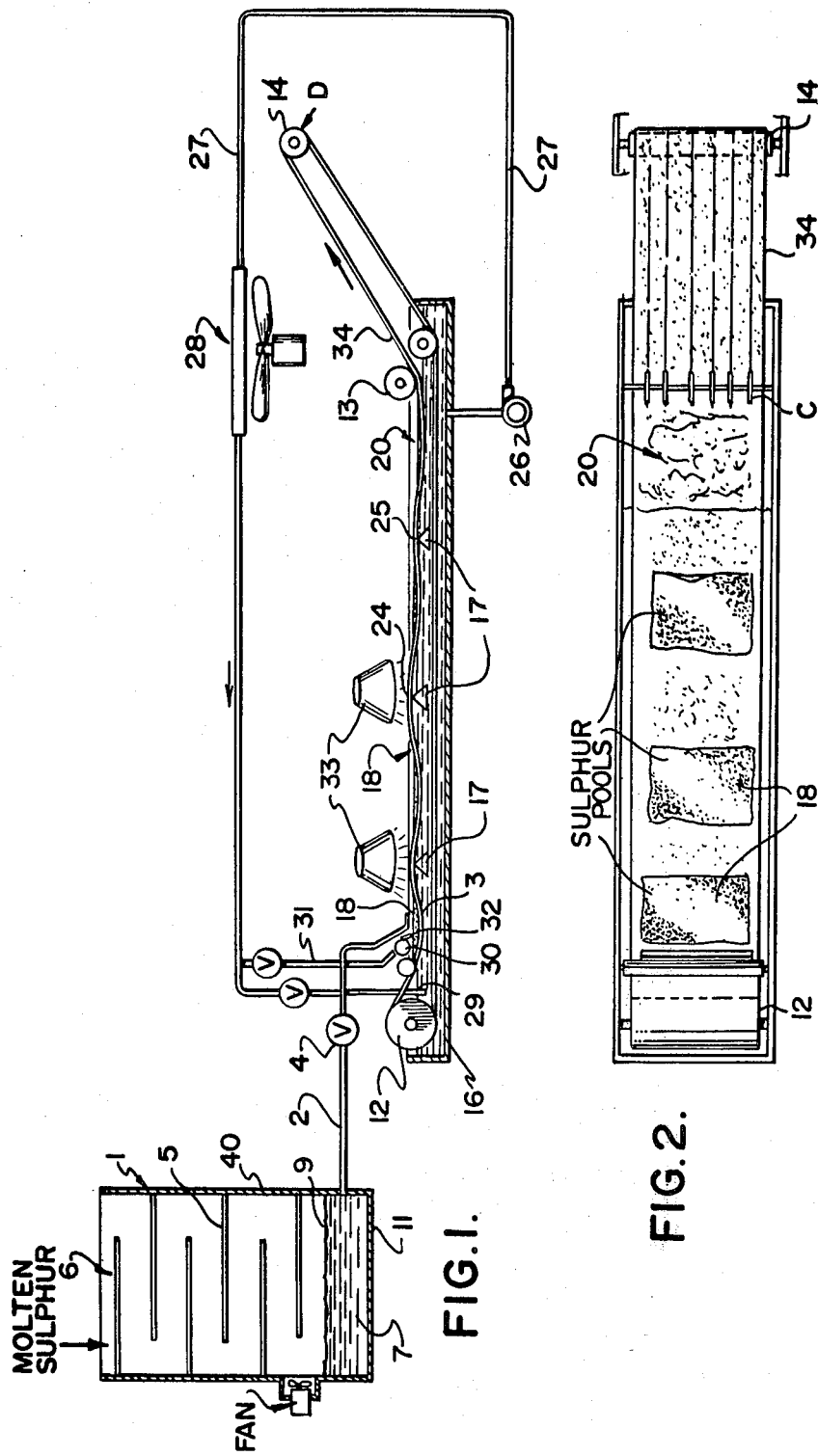

APPARATUS FOR THE SOLIDIFICATION OF MOLTEN SULPHUR

This is a division, of application Ser. No. 448,152, filed Mar. 4, 1974 which is a division of Ser. No. 207,909, filed Dec. 14, 1971, now U.S. Pat. No. 3,832,145.

This invention relates generally to a method and apparatus for the cooling and solidification of molten sulphur.

The present invention is a further development of and presents an alternative method and apparatus to that which is specifically taught in the applicant's U.S. Pat. No. 3,684,005 issued Aug. 15, 1972 in the name of E.R. Ellithorpe and R.B. Fletcher entitled "Method and Apparatus for the Solidification of Molten Sulphur." U.S. Pat. No. 3,684,005 discloses a method and apparatus for the solidification of molten sulphur, one embodiment of which involves the tilting of the surface of the movable member at selected points along its length so as to cause molten sulphur to flow transversely from one side of the surface to the other. Another embodiment disclosed in the aforesaid patent involves dipping or sequential dipping of the sulphur layer into a bath or series of baths of water arranged along the surface of the movable belt.

Further experimental work and practical experience since the filing of the application for the aforesaid patent have enabled the applicant to develop the alternative method and apparatus and special techniques which may be advantageously used at industrial scale levels. The need for further and better techniques in the treatment, cooling and solidification of molten sulphur has been readily apparent to men skilled in the art. It is a main object of the present invention to fill that need by the present method and apparatus which may be used with a high level of efficiency and accuracy of control on an industrial scale level and on a large volume basis.

The main aspect of the present invention taught herein includes a method and an apparatus for solidifying molten sulphur and also a method of cooling sulphur prior to its subjection to the method of solidification. A structural assembly adapted for the preliminary cooling of molten sulphur is also envisaged by the present invention.

The broad aspects of the method of solidifying molten sulphur of the present invention include the steps of providing a movable member which is so surfaced as to inhibit the adherence of sulphur thereto and forming on that member at least one undulation which is shaped to permit the formation of a pool of molten sulphur thereon. Molten sulphur is fed onto the member from a feeding section at a predetermined rate such that a pool of molten sulphur is caused to form in said undulation. The speed of the member is controlled in relation to the feed rate of the sulphur and in relation to the angle and length of the inclination of said undulation which is remote from said feeding section so that molten sulphur is caused to form into a layer and solidify on said member as it passes through and from said pool. Cooled or partially cooled sulphur in a stage of solidification is delivered from the surface.

It should be noted that when reference is made to the term "pools" herein, the term should be broadly interpreted as a formation of molten sulphur along the length of the supporting belt which is deeper or thicker than the layer of sulphur fed onto and carried by the remaining section of the belt. No special shape or limiting dictionary definition should be attributed to the term "pools" except that which is clear to the man skilled in the art from the nature of the teachings herein.

The apparatus aspect of the present invention broadly comprises a movable belt which is capable of supporting a layer of molten sulphur thereon. Means are included for the feeding of molten sulphur onto the normally upper surface of said movable belt and the upper surface is shaped to define at least one undulation along the length thereof. The undulation in the apparatus is such as to permit the formation of a pool of molten sulphur thereon. Means are provided for controlling the feed rate of the molten sulphur onto the belt as well as means for controlling the speed of the belt and means for delivering cooled or partially cooled sulphur from the belt.

The method and apparatus used for cooling the molten sulphur prior to its delivery onto the movable belt broadly comprises a housing which has a plurality of generally transversely disposed baffles mounted therein. A tank section is adapted to hold a predetermined level of molten sulphur therein. The baffles in the housing are so arranged as to permit the gravity flow of molten sulphur thereover into the tank section of the assembly. Means are provided for directing a supply of air into the assembly and onto the surface of the molten sulphur. An air deflector is positioned to deflect incoming air onto the surface of the molten sulphur and be warmed thereby whereby the warmed cooling air is permitted to impinge upon at least the lowermost baffles in the assembly so as to inhibit the freezing of partially cooled sulphur therein. Means may also be provided for sensing the level of molten sulphur in the tank section and maintaining that level substantially constant.

Reference is now made to the accompanying drawings which illustrate preferred embodiments of the invention and in which:

FIG. 1 is a diagrammatic layout of one embodiment of the present invention illustrating the formation of undulations and sulphur pools along the length of the belt;

FIG. 2 is a plan view of the arrangement illustrated in FIG. 1 with the sulphur cooling tank omitted therefrom;

With reference to the drawings, FIG. 1 illustrates the cooling tank 1 and the manner by which partially cooled liquid sulphur is fed through conduit 2 onto the belt 3 by means of valve control 4. Since the preliminary cooling of the sulphur in the cooling tank 1 is the first preferred step in the present invention, it would be appropriate to first describe this aspect before proceeding with a description of the further solidification steps.

Figure 3:
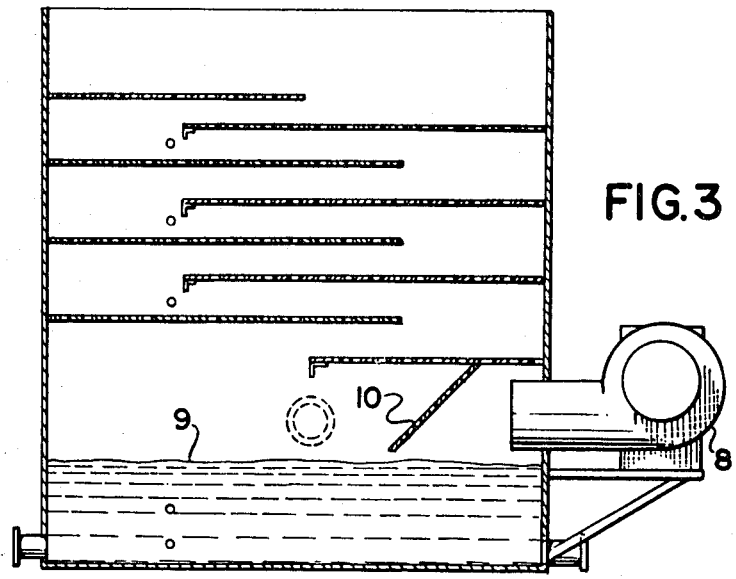
FIG. 3 is a diagrammatic view of a cooling tank for preliminary cooling of molten sulphur.

One or more sulphur cooling tanks may be employed in the present invention. The number of cooling tanks used is not critical. The number and shape of cooling tanks will be determined by factors such as convenience and economics and the volume of sulphur to be cooled prior to feeding onto the belt 3. The cooling tank 1 has a housing 40. A plurality of generally tranvsersely disposed baffles 5 are mounted within the housing 40. The baffles 5 are so mounted and spaced as to permit a volume of molten sulphur to be fed into the upper portion 6 of the tank to flow downwardly in steplike fashion into the base 7 of the tank. The gravity flow of the molten sulphur over the baffles 5 facilitates the cooling of the sulphur. Additionally, a supply of air may be introduced into the housing 4 by means of fan 8 illustrated in FIG. 3. The supply of air may be introduced at a point immediately above the level 9 of the liquid sulphur. The air is thus permitted to flow upwardly around the baffles 5 and so further facilitates the cooling of the downwardly flowing molten sulphur. It has been found in this way that appreciable cooling of the sulphur may be effected prior to its feeding onto the belt 3. For example, in normal processing sulphur having a temperature of 280°– 285°F may be received into the cooling tank 1 and cooled to approximately 260 – 263°F before it is discharged therefrom to the belt 3. A deflector 10 is mounted within the housing 4. The deflector 10 is positioned to divert at least a portion of the incoming air from fan 8 onto the surface 9 of the molten sulphur so warming the air by such contact. The slightly warmed air may thus act to inhibit the freezing of the partially cooled molten sulphur passing over the lowermost baffles 5 before the air passes upwardly over the remaining baffles 5 providing an advantageous cooling effect and is subsequently exhausted from the housing.

The control of the temperature of the molten sulphur may be further facilitated by the provision of a suitable louver structure disposed outwardly of the fan 8. The louver structure may be electrically connected to temperature sensitive devices whereby a change in temperature of the molten sulphur within the tank 1 would be readily sensed and automatically cause an adjustment in the position of the louver to control the air intake and so control the cooling effect. Temperature control is a factor in the production of good quality sulphur products and therefore should be carefully regarded. For example, if the temperature of the sulphur is too low, the sulphur may freeze on the upper surface of the laminate during the course of formation and so form undesirable rough areas of sulphur. On the other hand, if the temperature of the sulphur is too hot there may remain a liquid sulphur phase in the product subjected to the method herein and such product would be regarded as of interior quality.

Figure 4:
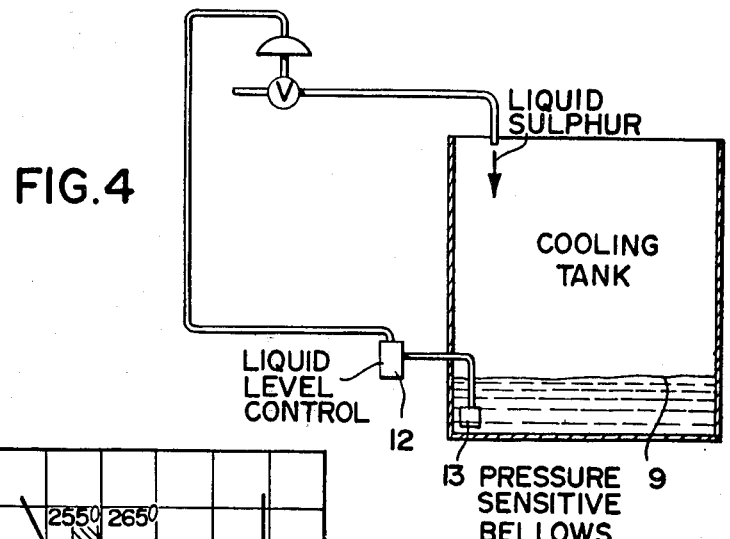
FIG. 4 is a schematic view showing the cooling tank of FIG. 3 and one form of liquid level control for the molten sulphur.

In order to avoid the use of sulphur pumps, the cooling tank 1 may be disposed at a height greater than the belt 3. The height differential should be such as to enable satisfactory flow through valve means disposed above the surface of the belt 3. In one embodiment of the process of the lowermost length of the belt 3 may be disposed approximately 4 feet from the ground while the bottom 11 of the cooling tank may be disposed approximately 10 feet from the ground. In order to maintain constant flow onto the belt 3 it is desirable to maintain the level of sulphur in the cooling tank 1 constant. A suitable level control system may be selected by the man skilled in the art to perform the function of level control in this process. One suitable level control system is illustrated schematically in FIG. 4 in association with the cooling tank 1. The level control 12 illustrated in FIG. 4 embodies the use of pressure sensitive bellows 13, the operation of which will be known to the man skilled in the art. In the operation of the method according to the present invention, it is preferable to isolate the cooling tank from atmospheric conditions. Such isolation provides more control of the degree of cooling which is desired for molten sulphur. If the cooling tank 1 is subjected to atmospheric conditions such as severe cold and severe heat, the cooling characteristics of the sulphur may accordingly be deleteriously affected.

Following the preliminary cooling of the molten sulphur in the tank 1 as previously outlined, molten sulphur is fed by gravity through conduit 2 and valve 4 onto the upper surface of movable belt 3. The molten sulphur is fed onto the belt in such a way that it preferably tends to spread out or disperse transversely across the surface of the belt 3 so that the largest possible area of the surface is utilized thus facilitating more rapid, uniform and efficient cooling and solidification. As can be seen from FIG. 1 the belt 3 is mounted for rotation and operation on an arrangement of conventional rollers and supporting structures indicated at 12, 13, 14 and 15 respectively. However, since the means of supporting and permitting rotation of the endless belt 3 are well known in the art, no detailed illustration or particularization will be presented thereon. The belt 3 and its supporting structure is housed generally and substantially within a bath structure 16 which has a coolant fluid such as water contained therein. The water is preferably of such a level that it provides at least some support for the belt 3. If the level of the water is carefully controlled and guaged the surface of the water could provide a significant support for the belt along a substantial section of the length thereof. Supporting structures 17 are structured and positioned to provide carefully controlled undulations and inclinations along predetermined lengths of the belt 3 as is illustrated by the undulations in FIG. 1 designated generally at 18, 19 and 20. The inclined surfaces indicated for example by 21 and 22 form apexes as indicated at 23, 24 and 25 at the points where the supporting structures 17 contact and support the belt 3. It will be noted that the supporting structures 17 are also substantially immersed in the water contained in the bath structure 16. Since the underside of the belt 3 is normally well wetted on its surface from the water contained in the bath structure 16, the water thus provides an effective lubricant to facilitate the smooth movement of the underside of the belt 3 over the supporting structure 17 and accordingly minimizes the co-efficient of friction between the two elements by virtue of this lubrication. It may also be possible to provide rotatable structures associated with the supporting structure 17 which rotate as the belt 3 passes thereover but this expedient has not been found either necessary or preferable by present experience and a non-movable structure 17 provides no serious disadvantages or seriously objectional wear characteristics.

The section of the belt designated generally at 20 and disposed generally remote from the feeding end of the belt 3 is shaped so that it depends into the water contained in the bath structure 16. This arrangement enables the partially cooled and partially solidified sulphur formed on the belt 3 to be subjected to a quenching action by its immersion in the bath water.

FIG. 1 illustrates a piping and recirculating system for the bath water. A water pump 26 is adapted to receive water from the bath 16 and pump it through conduit means 27. A water cooling section designated generally at 28 is adapted to cool the recirculated water before it is re-introduced into the bath at point 29 in FIG. 1. The cooling system for the recirculated water may be any conventional cooling arrangement. An airfan cooler is shown diagrammatically at 28 as an indication of one cooling arrangement which would be acceptable.

It has been found expedient to provide a transversely disposed perforated member 30 so that it receives a supply of water through branch conduit 31 and substantially saturates a felt doctor 32. The provision of this arrangement ensures that the belt 3 is continuously moistened so as to inhibit the firm adherence of sulphur thereto. In practice it has been found that if the perforated member 30 is sufficiently well supplied with water so as to saturate the felt doctor 32 associated therewith when the belt 3 is contacted by the doctor, a small pool of water develops rearwardly of the doctor 32 thus ensuring continuous moistening of the belt.

Air fans 33 may be disposed above the belt 3 for the purpose of directing cooling air onto the layer of sulphur being formed on the belt 3 essentially for the purpose of facilitating the cooling process.

It has been found in practice that as the belt 3 moves through and from the successive pools of molten sulphur arranged along the length of the belt at predetermined intevals, a layer of sulphur forms on the surface of the belt the thickness of which increases as the belt passes through each successive pool. Similarly the viscosity of the sulphur increases as the belt progresses along the length of the bath. Although tests have not been undertaken to determine the precise operable range of angles of incline which may be permitted on the belt 3 for good results, in substance it appears that the angle of the incline of the undulations 18 should be sufficient to successfully receive a layer of molten sulphur from the pool formed on the belt 3 and be carried upwardly to the apex of the belt undulation. It has been found in practice that a small angle of incline in the undulations of approximately ½° to 1° is sufficient to achieve good results. In linear terms this inclination may be expressed as a raise of approximately 2 inches over a length of approximately 6 feet. It has been found that two or possible three pools of molten sulphur may be employed in the successful operation of the process of the present invention. With the employment of two or three pools of molten sulphur the length of the belt may advantageously be approximately 80 feet. The final inclined surface 34 may usefully be approximately 20 feet in length at the normally disposed upper surface thereof. It may be noted that a main purpose of the final inclination 34 of the belt 3 is to enable surface water to be drained from the upper surface of the solidified sulphur layer which at that stage of the process will be formed on the surface of the belt prior to its ejection from the apparatus in sheet or slate-like form at the point indicated at D in FIG. 1.

The distances between the apex of the second and third undulations 18 is not believed to be absolutely critical and it is suggested that these distances may be adjusted for the purpose of ensuring the maximum cooling effect. The precise depth of the pool formed on the belt may vary but a main object should be to seek to utilize the fullest possible expanse of the belt 3 in the sulphur cooling and solidification process. Bath depths of between approximately ½ inch and 1 inch may be contemplated for successful use in operation.

It is not the purpose or intention of the present process to obtain a laminated structure such as is precisely taught and recommended in certain of the prior art. Although additional and successive layers of sulphur are developed as the belt 3 moves through the pools formed thereon, the additional sulphur picked up on the sulphur layer forming on the belt tends to increase the thickness of the originally formed layer of sulphur rather than forming a separate and distinct layer of lamination in the final product. This result may be a function of the particular process involved including considerations such as belt speed and sulphur viscosity. Nevertheless it is preferred to avoid the formation of a laminated structure since laminated structures appear to have a tendency to split or become deformed at the point of lamination, a deficiency and weakness which is not readily apparent in a unified sulphur formation.

A belt speed of 67 feet per minute has been found to be useful in practice. However, an operable range of belt speeds may be from 45 to 90 feet per minute. The speed of the belt is, however, related to the specific temperature of the molten material. The speed of the belt will remain constant having been selected. It may be said the the cooler the product, the more molten sulphur may be fed onto the belt to achieve successful results.

One of the functions of the provision of a plurality of pools of molten sulphur along the length of the bath is to ensure the fullest distribution of the sulphur over the transverse area of the belt so as to ensure the quickest and most efficient cooling thereof. As the sulphur is passed from the first to the second pool, cooling is effected in such a way that the viscosity index of the sulphur increases and by this increase a greater portion of the sulphur is picked up and carried on the inclined surface of the undulation 18 formed by the belt.

It has been found in practice that angles of incline of the undulations 18 along the length of the belt may be advantageously from between about ½° to 1° to ensure successful results. It is suggested that inclinations and undulations involving greater angles such as a range of from about ½° up to about 3° and perhaps greater may be used but the specific acceptability and utility obtained thereby may readily be determined by the man skilled in the art by non-inventive experimentation. The criticality of the inclinations of the undulations of the belt as predetermined sections thereof is a factor of the specific state of the cooled molten sulphur and the viscosity thereof at the point of inclination. The inclinations may be such that in the light of the state of the cooled or partially cooled molten sulphur material the force of gravity provided by the degree of inclination of the undulation does not counteract or nullify the velocity of the material on the belt 3. Molten sulphur of varying viscosities may be found in any one of the pools formed along the belt. This is not necessarily a problem in practice but preferably uniform distribution of the sulphur pools should be formed along the transverse section of the belt 3. The formation of upstanding lips for the purpose of arresting the transverse flow of the molten sulphur would encourage the formation of pools of uniform depth so as to provide in turn sulphur pools of substantially uniform viscosity. As indicated the sulphur pools are formed in undulations at predetermined sections of the belt 3. Although the depth of the pools is non-uniform, the thickness of the layers of sulphur on the belt 3 which result from the pool formation is nevertheless of substantial uniformity. A general central sagging of the belt 3 which is generally known in the art as "dishing" should be avoided since this tends to prevent the formation at the side areas of the belt 3 of layers of sulphur of substantially uniform thickness. Indeed, with this undesirable formation of the belt thin sections or layers of sulphur are formed which are readily friable and hence result in an undesirable final product.

In the development and experimentation which led to the completion of the successful method and apparatus taught herein, a number of different belt materials were considered. It has been found that there is a certain criticality in the material which should be used in the belt on which the sulphur layer is formed. This criticality relates to the necessity that the belt surface should be such as to provide and permit a completely wetted surface as opposed to that which is generally termed a "beaded" surface. Best results in terms of inhibiting firm sulphur adherence to the belt surface and in terms of providing effective lubrication as between the belt surface and the non-movable structures so as to reduce the co-efficient of friction therebetween can best be obtained by a surface which is completely wetable.

Example I set out below provides specific details of method and apparatus aspects of the present invention which have been found to provide good results in practice.

EXAMPLE I

| | |
|---|---|
| Total capacity of plant (5 slating units) | 1450–1800 long tons per day. |
| Capacity of one slating unit | 12–14 long tons per hr. |
| Belt length total | 212 feet (endless) |
| Effective exposed surface | 100 feet |
| Length of Horizontal surface | 80 feet |
| Length of inclined surface | 20 feet |
| Belt width | 60 inches |
| Belt speed | 67 feet/minute |
| Belt manufacturer | Uniroyal Nyply 140 |
| Distance from apex to apex in sulphur pool area (Distances vary in this range among the five units) | 6–12 feet |
| Depth of sulphur pools on belt | 1/2" to 1" |
| Total height differential from highest point on belt to lowest point in sulphur pool area | 1" to 2" |
| Thickness of sulphur sheet carryover out of first pool | 1/16" to 1/8" |
| Thickness of sulphur sheet carryover of second pool | 1/8" to 1/4" |

The details provided in the above Example I should be regarded as examplary only of the teachings herein. It may also be noted that the term "slating" which appears in Example I is a term which is generally used by men skilled in the art when referring to the cooling and solidification of layers of molten sulphur which provide slate-like formations as a final product.

Figure 5:
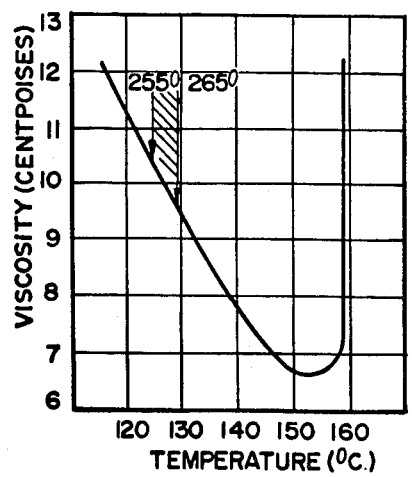
FIG. 5 is a chart showing a sulphur curve and the operating sulphur temperature upon the initial application to the belt.

The sulphur curves shown in FIG. 5 of the drawings are provided to more clearly show the operating sulphur temperature range upon its initial application to the belt 3. The range shown in the figure extends from 255° – 265°F but the upper and lower limits of this range may vary from time to time.

It may be seen that under steady state conditions the vertical rise or inclination of the undulations over which the sulphur will pass is a function of belt speed, liquid viscosity and angle of incline. With the previously mentioned conditions constant, the liquid level of the pools on the belt on the upstream side of the high point of the inclination will rise until the rate of carryover of the sulphur on the moving belt equals the rate of sulphur fed onto the belt and at that time the operation of the process will attain a steady and constant state of operation. In this manner sulphur pools are formed upstream of the high points of apexes of the undulations along the length of the belt travel. As the belt carries sulphur from one pool to the next the sulphur becomes solid or semi-solid and upon passing into the next pool an additional layer or lamination of sulphur carries over with the belt. In passing the total distance of the belt travel the thickness of the sulphur deposit is thus considerably increased with no apparent separation of the laminations. The pools formed also allow the sulphur additional cooling time while it is on the belt and thus aid in reducing total belt length. Additionally, the sulphur pools are useful in controlling the distribution of sulphur across the full width of the belt. This has permitted simplification of the total system of sulphur cooling and solidification as weirs for controlling initial flow of sulphur onto the belt are not required. Guide pans may be placed under the moving belt to hold the edges of the belt higher than the major surface thereof thus preventing liquid sulphur from flowing transversely from the belt.

After the partially cooled and semi-solidified layer of sulphur has passed through the quenching section 20 it passes up the inclined surface 34 of the belt. As previously indicated this length of travel of the sulphur layer permits the draining of surface water therefrom which has been picked up from the quenching section 20. For the purpose of ejecting or delivering the final product from the point D on the apparatus the layer of sulphur may usefully be cut or sliced lengthwise before it reaches the point D thus facilitating the efficient delivery therefrom. One embodiment of the invention envisages the use of rotating cutters C disposed after the quenching section as shown in FIG. 2. However, an alternative arrangement provides only for the disposition of a plurality of tire structures disposed transversely of the sulphur layer and in essentially the same position as the cutters C. The tire structures are brought to bear on the surface of the cooled sulphur so as to guide it in an upward direction along the inclined path shown in FIG. 1. No preliminary cutting of the sulphur layer is necessary to ensure successful distribution from the apparatus but some operators may prefer to cut as a matter of desired practice.

The refinements and the improvements in sulphur cooling and solidification presented herein are believed to provide a distinct advance in the art and one which may well benefit industry and the public generally.

The embodiment of the invention in which an exclusive property or privilege is claimed are defined as follows:

1. Apparatus for the solidification of molten sulphur comprising:
   a. a movable endless substantially horizontal belt for supporting a layer of molten sulphur thereon;
   b. means for feeding molten sulpur onto the normally upper surface of said movable belt at a first of a plurality of pools of molten sulfur;

c. a supporting structure disposed beneath the upper surface of said belt so as to define at least three undulations arranged in predetermined spaced relationship along the length of said belt, said undulations being such as to permit the formation of said plurality of separate and distinct pools of molten sulphur thereon;

d. means for controlling and balancing the feed rate of said molten sulphur, the speed of said belt in relation to the angle and length of the inclination of the undulation which extends upwardly and away from said feeding section so that in continuous operation a constant level of molten sulphur in said pools is maintained;

e. means for delivering cooled sulphur from said belt and f. means for providing a cooling bath of aqueous medium in contact with said surface.

2. Apparatus as claimed in claim 1 wherein the angle of the inclinations in said undulation ranges from about ½° to about 3°.

3. Apparatus as claimed in claim 1 wherein the angle of the inclinations in said undulation is about 1°.

4. Apparatus as defined in claim 1 including a perforated member is disposed transversely of said movable belt in the vicinity of the feeding end thereof, said perforated member being adapted to provide a supply of water to the upper surface of said belt and maintain it in a generally wetted condition.

5. Apparatus as defined in claim 4 wherein a felt doctor is associated with said perforated member in such a way that the water delivered from said perforated member is sufficient to saturate said doctor so as to maintain the surface of said belt in a wetted condition.

6. Apparatus as claimed in claim 1 including means for cooling said molten sulphur to a temperature of between about 255°F and about 265°F and means for feeding said cooled molten sulphur to the normally upper surface of said belt.

7. Apparatus as claimed in claim 1 including a tank structure shaped to house said apparatus and maintain a bath of water therewithin including means for recirculating the water and reintroducing the water into the tank.

8. Apparatus as claimed in claim 7 including means for cooling the recirculated water said means being disposed intermediate the point of extraction of the water from said tank and the point of the introduction of said water thereto.

* * * * *

UNITED STATES PATENT AND TRADEMARK OFFICE
CERTIFICATE OF CORRECTION

PATENT NO. : 3,912,431
DATED : October 14, 1975
INVENTOR(S) : Ellithorpe, et al

It is certified that error appears in the above-identified patent and that said Letters Patent are hereby corrected as shown below:

In column 3, line 51 delete "interior" and insert --inferior--.

In column 3, line 57 after "process" delete --of--.

In column 6, line 13 delete "of" and insert --or--.

In column 6, line 51 delete "as" and insert --at--.

In column 8, line 65 after "for" insert --cooling and--.

Signed and Sealed this sixth Day of January 1976

[SEAL]

Attest:

RUTH C. MASON
*Attesting Officer*

C. MARSHALL DANN
*Commissioner of Patents and Trademarks*